United States Patent
Bitran et al.

(10) Patent No.: US 8,462,746 B2
(45) Date of Patent: *Jun. 11, 2013

(54) WIRELESS RECEIVER WITH INTERMITTENT SHUT-OFF OF RF CIRCUITS

(75) Inventors: Yigal Bitran, Ramat Hasharon (IL); Ariel Yagil, Ramat Hasharon (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 671 days.

This patent is subject to a terminal disclaimer.

(21) Appl. No.: 12/518,426

(22) PCT Filed: Dec. 24, 2007

(86) PCT No.: PCT/IL2007/001600
§ 371 (c)(1), (2), (4) Date: Jun. 10, 2009

(87) PCT Pub. No.: WO2009/081388
PCT Pub. Date: Jul. 2, 2009

(65) Prior Publication Data
US 2010/0284379 A1 Nov. 11, 2010

Related U.S. Application Data

(63) Continuation-in-part of application No. 11/647,123, filed on Dec. 27, 2006, now Pat. No. 7,881,252.

(51) Int. Cl.
H04W 4/00 (2009.01)
(52) U.S. Cl.
USPC .......... 370/338; 370/329; 370/336; 375/316; 455/574

(58) Field of Classification Search
None
See application file for complete search history.

(56) References Cited

U.S. PATENT DOCUMENTS

| 5,376,929 A | 12/1994 | Rakolta et al. |
| 5,956,656 A | 9/1999 | Yamazaki |

(Continued)

FOREIGN PATENT DOCUMENTS

| CN | 1206308 A | 1/1999 |
| WO | 00/10336 A2 | 2/2000 |

(Continued)

OTHER PUBLICATIONS

International Application PCT/IL2007/001600 Search Report dated Mar. 30, 2009.

(Continued)

*Primary Examiner* — Nimesh Patel
*Assistant Examiner* — Daniel Nobile
(74) *Attorney, Agent, or Firm* — D. Kliger I.P. Services Ltd.

(57) ABSTRACT

A terminal (24) for use in a wireless network (20) includes a radio frequency (RF) receiver (30), which is configured to receive and downconvert a RF signal. The RF signal includes downlink frames, each downlink frame including at least an allocation zone followed by a data zone. The allocation zone contains an indication of a time allocation in the data zone during which downlink data will be transmitted to the terminal. An analog/digital (A/D) converter (36) converts the output signal from the RF receiver into a stream of digital samples. A digital processing circuit (40, 52, 54, 56) processes the digital samples so as to identify the time allocation and to recover the downlink data transmitted during the identified time allocation, while shutting down the RF receiver during at least one interval during the downlink frame that is outside the identified time allocation.

28 Claims, 6 Drawing Sheets

U.S. PATENT DOCUMENTS

| | | | |
|---|---|---|---|
| 6,985,432 | B1 | 1/2006 | Hadad et al. |
| 7,126,996 | B2 | 10/2006 | Classon et al. |
| 7,133,646 | B1 | 11/2006 | Miao |
| 7,133,669 | B2 | 11/2006 | Nair et al. |
| 7,181,190 | B2 | 2/2007 | Abhishek et al. |
| 7,363,051 | B2 | 4/2008 | Bridgelall |
| 7,406,296 | B2 | 7/2008 | Haartsen |
| 7,542,728 | B2 | 6/2009 | Bitran et al. |
| 7,545,787 | B2 | 6/2009 | Bitran et al. |
| 7,567,820 | B2 | 7/2009 | Bitran |
| 2002/0136233 | A1 | 9/2002 | Chen et al. |
| 2002/0181509 | A1 | 12/2002 | Mody et al. |
| 2003/0054788 | A1 | 3/2003 | Sugar et al. |
| 2003/0086371 | A1 | 5/2003 | Walton et al. |
| 2003/0169824 | A1 | 9/2003 | Chayat |
| 2004/0014505 | A1 | 1/2004 | Rainish et al. |
| 2004/0029619 | A1 | 2/2004 | Liang et al. |
| 2004/0162106 | A1 | 8/2004 | Monroe et al. |
| 2005/0020299 | A1 | 1/2005 | Malone et al. |
| 2005/0025093 | A1 | 2/2005 | Yun et al. |
| 2005/0059347 | A1 | 3/2005 | Haartsen |
| 2005/0148306 | A1* | 7/2005 | Hiddink ............ 455/101 |
| 2005/0195786 | A1 | 9/2005 | Shpak |
| 2005/0266853 | A1 | 12/2005 | Gallagher et al. |
| 2006/0198476 | A1 | 9/2006 | Palaskas et al. |
| 2006/0221917 | A1 | 10/2006 | McRae |
| 2007/0066359 | A1 | 3/2007 | Zhuang |
| 2007/0076649 | A1 | 4/2007 | Lin et al. |
| 2007/0082716 | A1 | 4/2007 | Behzad et al. |
| 2007/0104145 | A1 | 5/2007 | Jan |
| 2007/0110003 | A1 | 5/2007 | Tujkovic et al. |
| 2007/0124478 | A1 | 5/2007 | Abdelhamid et al. |
| 2007/0140256 | A1 | 6/2007 | Yaqub |
| 2007/0153834 | A1 | 7/2007 | Qu et al. |
| 2007/0184835 | A1 | 8/2007 | Bitran et al. |
| 2007/0201369 | A1* | 8/2007 | Pedersen et al. ............ 370/235 |
| 2007/0275746 | A1 | 11/2007 | Bitran |
| 2008/0025422 | A1 | 1/2008 | Bitran et al. |
| 2008/0192720 | A1 | 8/2008 | Frederiksen et al. |
| 2008/0240022 | A1 | 10/2008 | Yoon et al. |
| 2008/0298316 | A1 | 12/2008 | Bitran et al. |
| 2009/0088172 | A1 | 4/2009 | Lusky et al. |
| 2009/0129367 | A1 | 5/2009 | Bitran et al. |
| 2010/0202384 | A1 | 8/2010 | Baker et al. |
| 2010/0248750 | A1 | 9/2010 | Muller et al. |
| 2010/0322158 | A1 | 12/2010 | Lee et al. |
| 2010/0330992 | A1 | 12/2010 | Bhattacharjee et al. |

FOREIGN PATENT DOCUMENTS

| | | | |
|---|---|---|---|
| WO | 2006134472 | A2 | 12/2006 |
| WO | 2007127942 | A2 | 11/2007 |
| WO | 2008078311 | A2 | 7/2008 |

OTHER PUBLICATIONS

U.S. Appl. No. 11/638,267 Official Action dated Oct. 6, 2008.

Philips Semiconductors, "How 802.11b/g WLAN and Bluetooth Can Play", White Paper, Koninklijke Philips Electronics N.V., Netherlands, 2005.

Texas Instruments Incorporated, "Wireless Performance Optimization Solutions: Bluetooth and 802.11 coexistence", USA, 2003.

U.S. Appl. No. 11/638,265 Official Action dated Oct. 7, 2008.

International Application PCT/IL2007/000147 Search Report dated Sep. 12, 2008.

Bluetooth, "Specification of the Bluetooth System: Master Table of Contents & Compliance Requirements: Core Package Version 2.0+ EFR", Nov. 4, 2004.

Gesbert et al., "From Theory to Practice: An Overview of MIMO Space-Time Coded Wireless Systems", IEEE Journal on Selected Areas in Communications, vol. 21, No. 3, pp. 281-302, Apr. 2003.

IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.

IEEE Standard 802.16e-2005 for Local and metropolitan area networks, "Part 16: Air Interface for Fixed Broadband Wireless Access Systems; Amendment 2 and Corrigendum 1", Physical and Medium Access Control Layers for Combined Fixed and Mobile Operation in Licensed Bands, Amendment and Corrigendum to IEEE Standard 802.16-2004, IEEE Computer Society and IEE Microwave Theory and Techniques Society, USA, Feb. 28, 2006.

IEEE Inc., "A compilation based on IEEE Standard 802.11-1999 (revision 2003) and its amendments", IEEE Wireless LAN Edition, IEEE Press, USA, 2003.

Tomchik J., "QFDD and QTDD: Proposed Draft Air Interface Specification", IEEE 802.20 Working Group on Mobile Broadband Wireless Access, Qualcomm, Inc., USA, Oct. 28, 2005.

U.S. Appl. No. 11/638,629 Official Action dated Sep. 29, 2008.

U.S. Appl. No. 11/647,122 Official Action dated Sep. 15, 2008.

U.S. Appl. No. 11/647,122 Official Action dated Mar. 13, 2009.

Altair Semiconductor, "TRIMAX: Coexistence of WiMAX, Bluetooth and WLAN in converged handsets (Non NDS version)", White paper 0012, Revision 1.00, Jul. 2006.

Bachu et al., "Linear Interference Cancellation for Downlink Map Reception in IEEE 802.16E", The 17th Annual IEEE International Symposium on Personal, Indoor and Mobile Radio Communications (PIMRC06), Helsinki, Finland, Sep. 11-14, 2006.

International Application No. PCT/IL2007/000008 Search report dated Sep. 11, 2008.

International Application No. PCT/IL2007/000899 Search report dated Apr. 21, 2008.

Klang et al., "Identification of Radio-Link Technologies", Deliverable D2.1 of the Wireless World Initiative—New Radio (WINNER), ISR-2003-507581, version 1.0, Jul. 1, 2004.

Laine, Jeremy, "Interference Estimation in a Multicellular OFDMA Environment", Master Thesis, Department of Signals, Sensors and Systems, Royal Institute of Technology, Stockholm, Sweden, Jul. 2004.

Tang et al., "Space-Time Interference Cancellation in MIMO-OFDM Systems", IEEE Transactions on Vehicular Technology, vol. 54, No. 5, pp. 1802-1816, Sep. 2005.

U.S. Appl. No. 11/647,123 Official Action dated Aug. 28, 2009.

International Application PCT/IB2012/050337 Search Report dated Jun. 1, 2012.

CN Patent Application # 200780051518.6 Office Action dated Jan. 30, 2013.

* cited by examiner

WIRELESS RECEIVER WITH INTERMITTENT SHUT-OFF OF RF CIRCUITS

CROSS-REFERENCE TO RELATED APPLICATIONS

This application is a continuation in part of U.S. patent application Ser. No. 11/647,123, filed Dec. 27, 2006, whose disclosure is incorporated herein by reference.

FIELD OF THE INVENTION

The present invention relates generally to wireless communications, and specifically to controlling the operation of a wireless communication terminal.

BACKGROUND OF THE INVENTION

WiMAX (Worldwide Interoperability for Microwave Access) is a new technology for wireless packet data communications. WiMAX is similar in concept to wireless local area network (WLAN) technologies defined by IEEE standard 802.11, but has a number of enhancements designed to improve performance and range. The original WiMAX standard, IEEE 802.16, specified WiMAX in the 10-66 GHz range. More recently, IEEE 802.16a added support for the 2-11 GHz range, and IEEE 802.16e (approved as IEEE 802.16-2005) extended WiMAX to mobile applications, using an enhanced orthogonal frequency division multiple access (OFDMA) modulation scheme. In the context of the present patent application and in the claims, the term "802.16" is used to refer collectively to the original IEEE 802.16 standard and all its variants and extensions, unless specifically noted otherwise.

For purposes of power saving, IEEE 802.16-2005 (see particularly section 6.3.21) defines a sleep mechanism, which can be used to reduce the duty cycle during which a mobile station (MS) must listen for downlink signals. To invoke the mechanism, the MS transmits a sleep request (SLP-REQ) signal to the base station, identifying the frames during which the MS will be sleeping and will therefore not receive downlink signals. During these sleep frames, the MS may shut down some of its circuits and thus reduce power consumption without risk of missing a downlink transmission.

The Third Generation Partnership Project Long Term Evolution (3GPP-LTE) is another new technology for wireless packet communications, which is also known as Evolved Universal Terrestrial Radio Access (E-UTRA). LTE standards are being developed by the Radio Access Networks (RAN) Technical Specification Group (TSG) of the 3GPP. In some respects, LTE is similar to the WiMAX technology specified by the IEEE 802.16e standard. For example, both standards use an enhanced Orthogonal Frequency Division Multiplexing (OFDM) modulation scheme in the downlink (DL) channel.

The LTE standard defines a sleep mechanism called "Discontinuous Reception (DRX) in RRC_Connected mode." The DRX mechanism is used to reduce the duty cycle in which a user terminal (referred to in LTE as User Equipment—UE) attempts to receive downlink signals from a base station (referred to as an evolved-NodeB—eNodeB). The DRX mechanism defines an on duration, in which the UE monitors LTE control messages transmitted by the eNodeB for possible allocations, and also carries out various signal measurements. Outside the on duration, the UE does not receive downlink signals.

SUMMARY OF THE INVENTION

In wireless multiple access systems such as WiMAX and LTE, a base station (BS) transmits and receives signals in a sequence of synchronous frames. The base station assigns respective time allocations to the wireless terminals for reception and transmission within each frame dynamically, depending on data transmission requirements. The base station typically transmits the assignments of the time allocations during an allocation zone, which is located near the beginning of each downlink frame. The allocations indicate the times during which downlink data will be transmitted to each terminal during a subsequent data zone of the frame (as well as subsequent uplink transmission times).

The terminology that is used to describe the different air interface and protocol elements may differ in different standards. For example, the WiMAX standard defines frames, which are subdivided into uplink and downlink sub-frames and may be further subdivided into zones. The LTE standard, on the other hand, defines frame sequences, which may comprise uplink and/or downlink sub-frames. WiMAX base stations transmit allocation information to user terminals in a "map zone" located in the beginning of the downlink frame, whereas LTE eNodeB's transmit the allocation information in dedicated OFDM symbols called Physical Downlink Control Channels (PDCCHs), which are located near the beginning of the downlink sub-frame. In the present patent application and in the claims, reference is generally made to a base station (which may comprise, for example, a WiMAX BS or an LTE eNodeB), to wireless terminals (e.g., WiMAX mobile stations or LTE UE), to downlink and uplink frames (which may comprise, for example, WiMAX frames or LTE sub-frames), and to allocation information (which may comprise, for example, WiMAX map messages or LTE PDCCHs). These terms should thus be understood as applying to the corresponding elements in any applicable wireless standard, even if that standard customarily uses different terminology.

Disclosed embodiments of the present invention take advantage of the frame structure of an applicable standard in order to shut down elements of the terminal during intervals within a downlink frame in which it is expected that there will be no data for the terminal to receive. The terminal circuits are activated to receive and process downlink data that are transmitted by the base station during the allocation zone and then during the assigned time allocation within the data zone. During intervals outside the assigned time allocation, however, certain elements of the terminal, such as the radio receiver, are shut down in order reduce power consumption. (The term "shutdown" is used broadly in the context of the present patent application and in the claims to refer to any change of operating mode that reduces power consumption by reducing functionality.) This sort of intra-frame shutdown may be used in addition to full-frame shutdown techniques, such as the WiMAX and LTE sleep mechanisms mentioned above, in order to minimize power consumption and maximize battery life of wireless terminals.

There is therefore provided, in accordance with an embodiment of the present invention, a terminal for use in a wireless network, the terminal including:

a radio frequency (RF) receiver, which is configured to receive and downconvert a RF signal so as to generate an output signal, the RF signal including downlink frames, each downlink frame including at least an allocation zone followed by a data zone, the allocation zone containing an indication of a time allocation in the data zone during which downlink data will be transmitted to the terminal;

an analog/digital (A/D) converter, which is coupled to convert the output signal into a stream of digital samples; and a digital processing circuit, which is coupled to process the digital samples so as to identify the time allocation, responsively to the indication in the allocation zone, and to recover the downlink data transmitted during the identified time allocation, while shutting down the RF receiver during at least one interval during the downlink frame that is outside the identified time allocation.

In some embodiments, the digital processing circuit includes:

a digital physical layer interface (PHY);

a medium access control (MAC) processor; and a power controller, which is coupled to shut down at least one digital component of the terminal, in addition to the RF receiver, during the at least one interval, the at least one digital component selected from a group of components consisting of the A/D converter, the PHY, and the MAC processor.

In an embodiment, the time allocation has a start time and an end time, and the digital processing circuit is configured to shut down the RF receiver after receiving the indication in the allocation zone, and then to activate the RF receiver at a first time that precedes the start time of the time allocation by a first margin, and to shut down the RF receiver at a second time that follows the end time of the time allocation by a second margin.

In another embodiment, the digital processing circuit is configured to process the digital samples during a first part of the downlink frame in order to determine one or more characteristics of a wireless channel over which the RF signal is received, and to determine the first and second margins responsively to the one or more characteristics. In a disclosed embodiment, the one or more characteristics include channel coherence characteristics, and the first and second margins increase as a coherence of the wireless channel decreases. The channel coherence characteristics may include a temporal coherence and a bandwidth coherence. Typically, the first and second margins increase as the temporal coherence increases and as the bandwidth coherence decreases. In yet another embodiment, the one or more characteristics include a signal/noise ratio (SNR) of the wireless channel, and the first and second margins increase as the SNR of the wireless channel decreases.

In some embodiments, the downlink frame includes a preamble that precedes the allocation zone, and the digital processing circuit is configured to process the digital samples during the preamble in order to determine the one or more characteristics of the wireless channel.

In an embodiment, the digital control circuit is coupled to determine the first margin for a time allocation in a given downlink frame responsively to a frame that precedes the given downlink frame. The digital control circuit may be coupled to determine the first margin responsively to performing at least one action selected from a group of actions consisting of:

determining whether the frame that precedes the given downlink frame includes another downlink frame; and determining whether the frame that precedes the given downlink frame contains another time allocation to the terminal.

In another embodiment, the digital control circuit is coupled to determine the second margin for a time allocation in a given downlink frame responsively to a frame that follows the given downlink frame. The digital control circuit may be coupled to determine the second margin responsively to determining whether the frame that follows the given downlink frame includes another downlink frame.

In yet another embodiment, the digital processing circuit is configured to make a determination that no time has been allocated for transmission to the terminal during a given downlink frame, and to shut down the RF receiver through all of the data zone of the given downlink frame responsively to the determination.

In some embodiments, the downlink frames are transmitted by a base station in accordance with an IEEE 802.16 standard. The digital processing circuit may be coupled to identify the time allocation by decoding a downlink map message transmitted in the allocation zone.

In an alternative embodiment, the downlink frames are transmitted by an evolved NodeB (eNodeB) in accordance with a Third Generation Partnership Project-Long Term Evolution (3GPP-LTE) standard. The digital processing circuit may be coupled to identify the time allocation by decoding Physical Downlink Control Channel (PDCCH) symbols transmitted in the allocation zone.

There is additionally provided, in accordance with an embodiment of the present invention, a method for communication, including:

receiving and downconverting a radio frequency (RF) signal using a RF receiver of a wireless terminal, so as to generate an output signal, the RF signal including downlink frames, each downlink frame including at least an allocation zone followed by a data zone, the allocation zone containing an indication of a time allocation in the data zone during which downlink data will be transmitted to the wireless terminal;

converting the output signal into a stream of digital samples; and processing the digital samples so as to identify the time allocation, responsively to the indication in the allocation zone, and to recover the downlink data transmitted during the identified time allocation, while shutting down the RF receiver and/or other components during at least one interval during the downlink frame that is outside the identified time allocation.

The present invention will be more fully understood from the following detailed description of the embodiments thereof, taken together with the drawings in which:

DETAILED DESCRIPTION OF EMBODIMENTS

Figure 1:
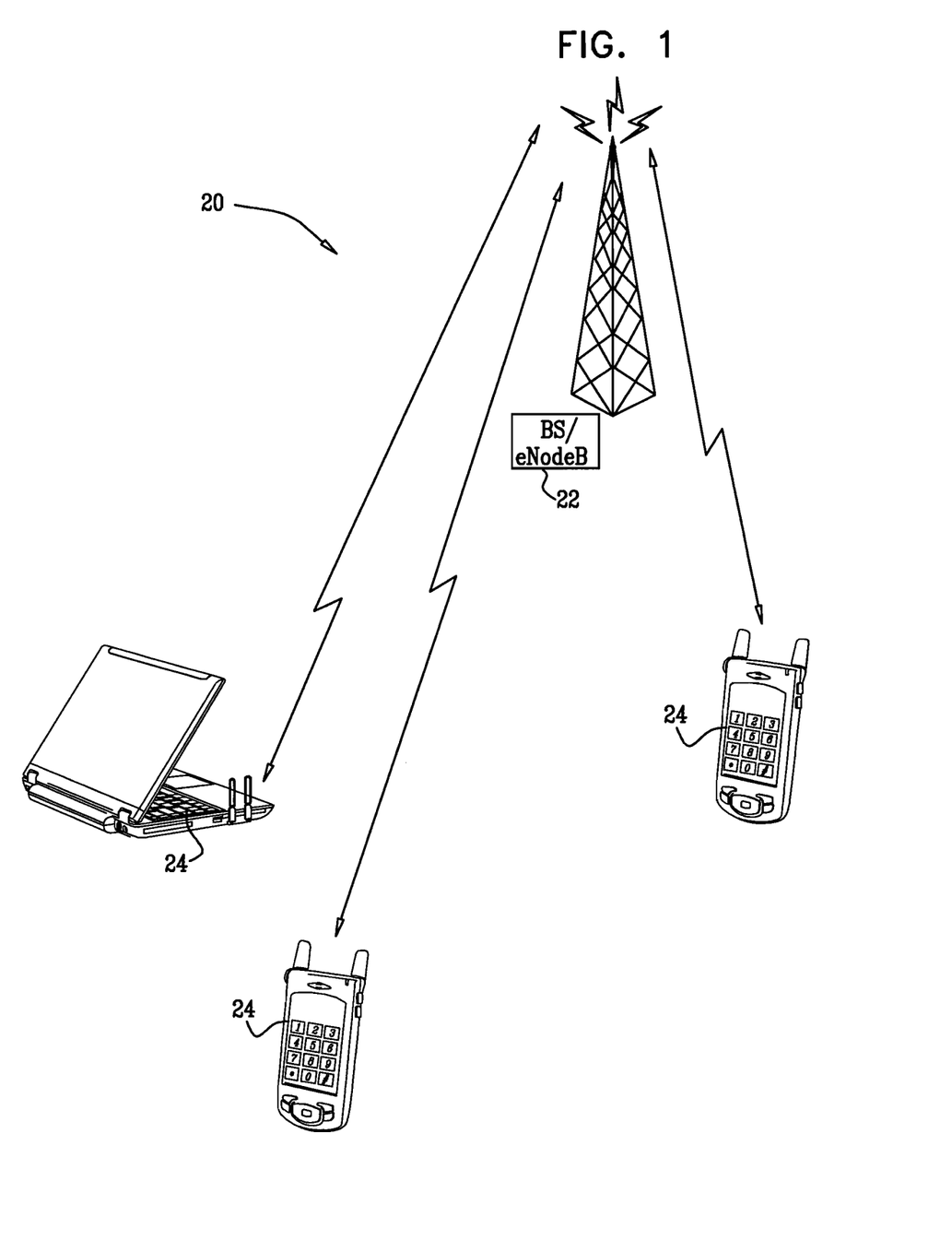
FIG. 1 is a schematic, pictorial illustration of a wireless network system, in accordance with an embodiment of the present invention.
Figure 6:
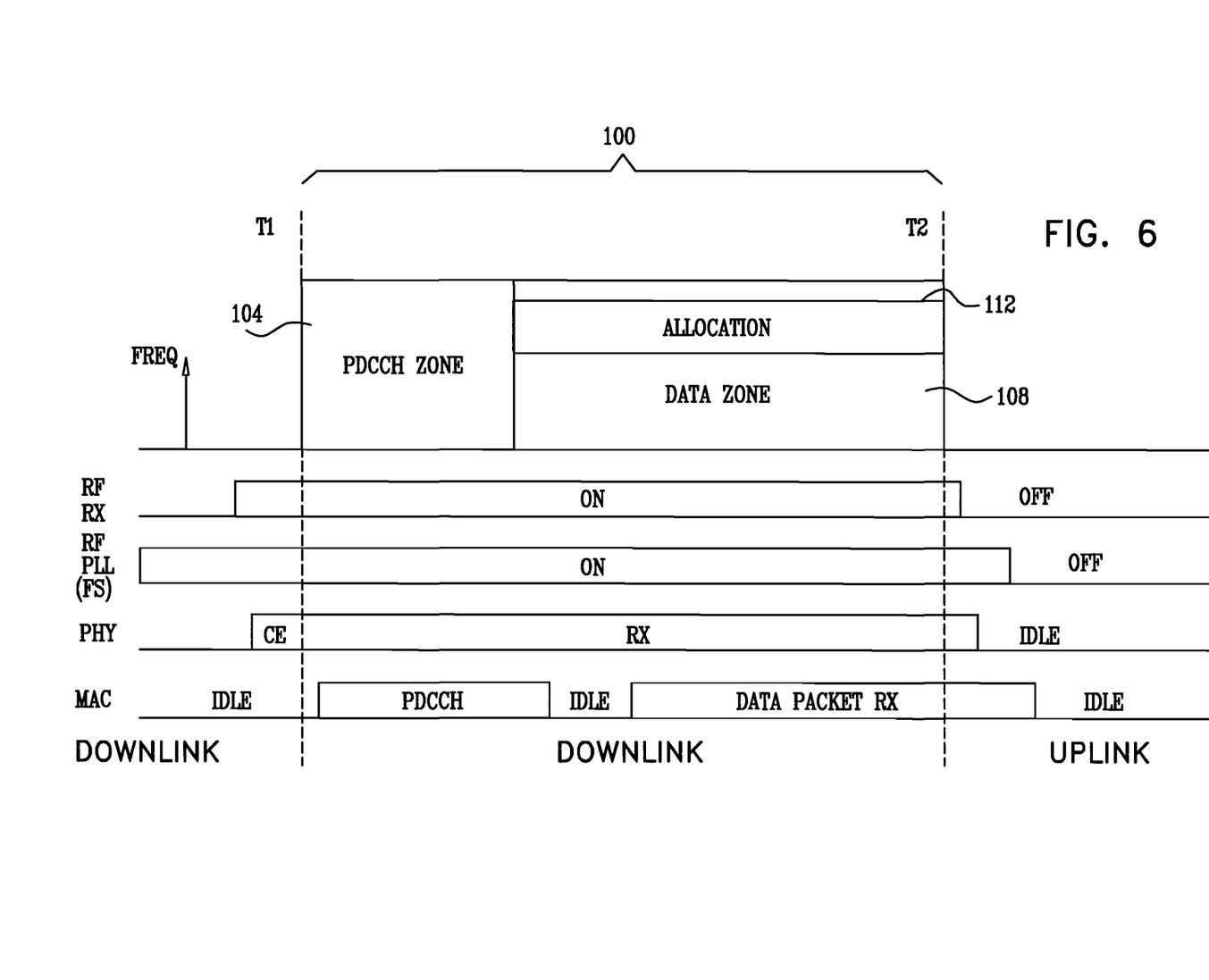
FIG. 6 is a schematic timing diagram showing a scheme for activation and shutdown of elements of a wireless terminal, in accordance with an alternative embodiment of the present invention.
Figure 7:
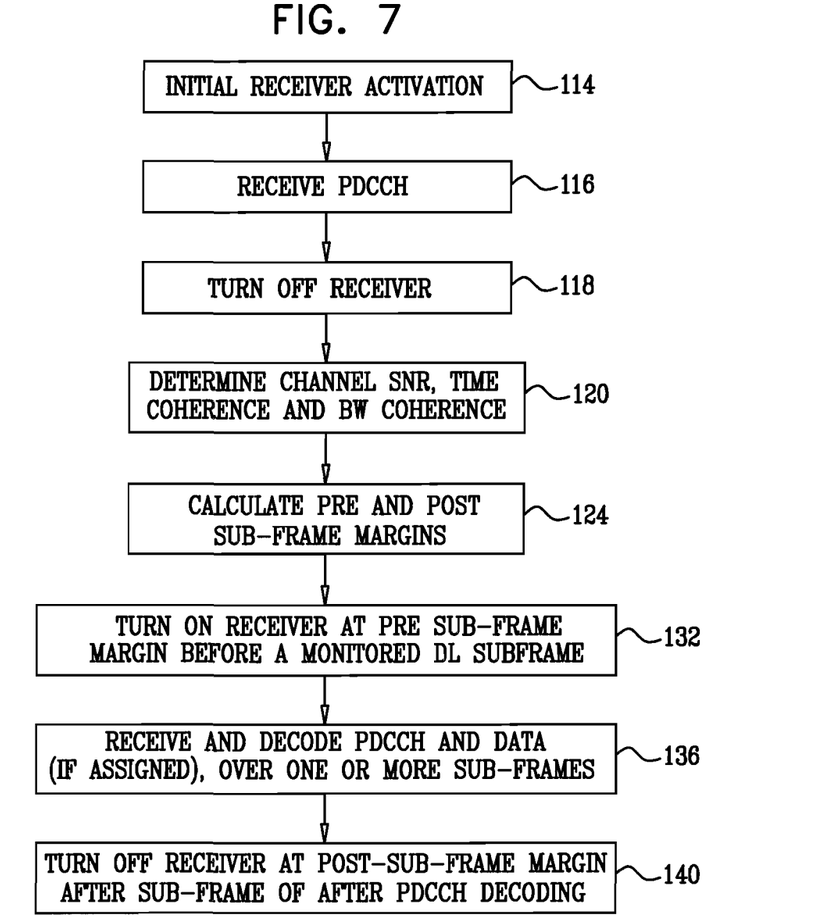
FIG. 7 is a flow chart that schematically illustrates a method for activation and shutdown of elements of a wireless terminal, in accordance with an alternative embodiment of the present invention.

FIG. 1 is a schematic, pictorial illustration of a wireless network system 20, in accordance with an embodiment of the present invention. The description of FIGS. 1-5 below mainly addresses systems that operate in accordance with one or more of the WiMAX IEEE 802.16 standards cited above, for the sake of convenience and clarity. FIGS. 6 and 7 address aspects of operation in accordance with the LTE standard. Further alternatively, system 20 may operate in accordance with other slotted multiple-access wireless standards. Standards of this sort are defined, for example, in the specifications of the 3GPP2 Evolution-Data Optimized (EVDO) Rev C and the IEEE 802.20 High Speed Mobile Broadband Wireless Access (MBWA) specifications.

System 20 comprises multiple wireless terminals 24 (referred to as mobile stations in WiMAX parlance), which communicate with a base station (BS) 22 during certain assigned time allocations in a sequence of frames defined by the base station. The frame structure and timing are described hereinbelow with reference to FIG. 3. (An alternative timing scheme that can be used in LTE systems is shown in FIG. 6 further below.) Optionally, terminals 24 may be configured for communication over other wireless networks, such as WLAN and/or Bluetooth networks, in addition to the WiMAX network, but this aspect of mobile station operation is beyond the scope of the present invention. Although certain types of wireless terminals are shown, by way of example, in FIG. 1, the term "wireless terminal" as used in the present patent application and in the claims should be understood broadly to refer to any and all suitable sorts of consumer electronics, computing and communication devices in which the principles of the present invention may be implemented.

Figure 2:
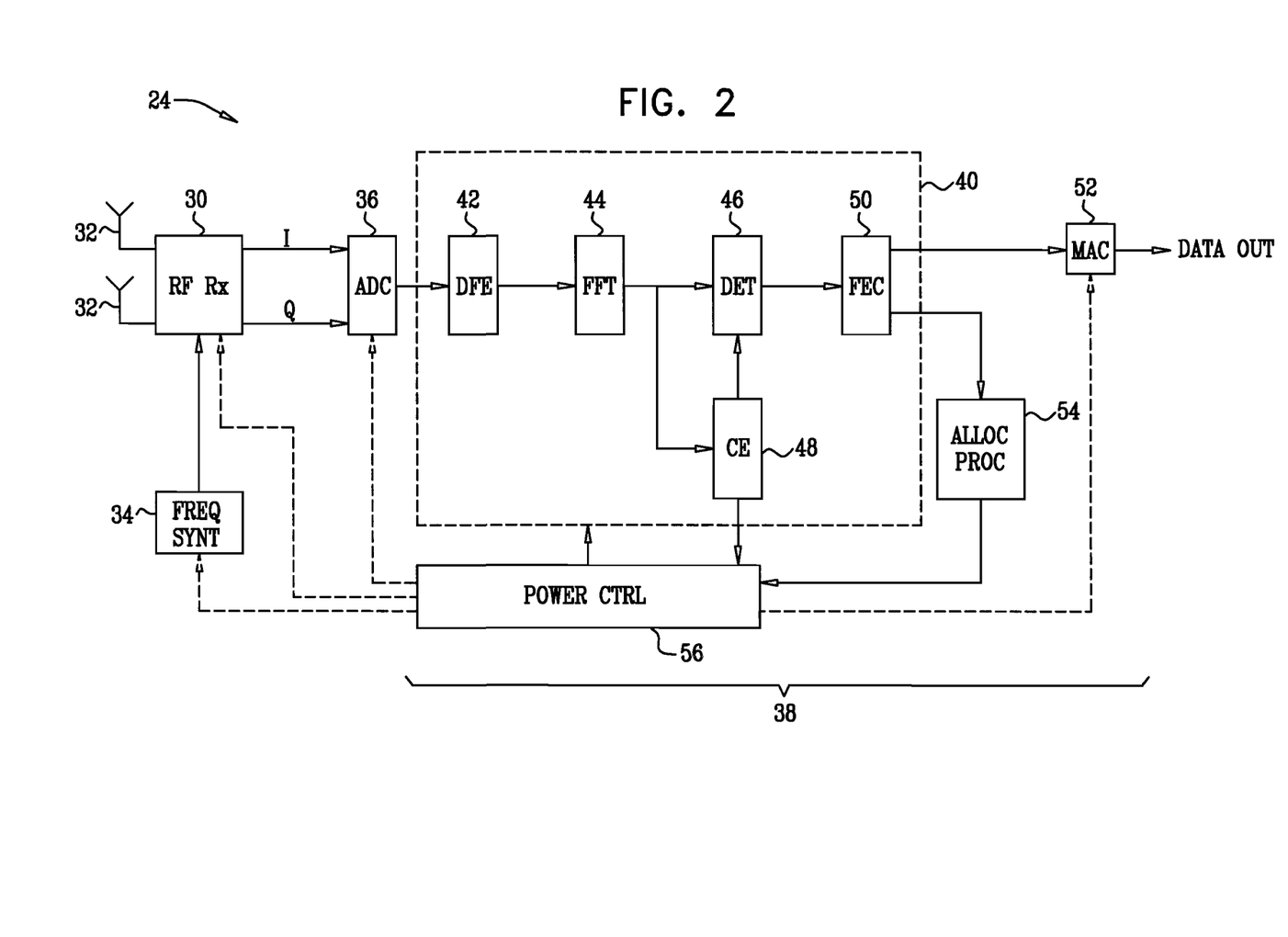
FIG. 2 is a block diagram that schematically illustrates a wireless terminal, in accordance with an embodiment of the present invention.

FIG. 2 is a block diagram that schematically shows elements of one of wireless terminals 24, in accordance with an embodiment of the present invention. The figure shows only certain elements of the data receiver portion of the wireless modem used in terminal 24 that are useful in understanding the present invention. The transmitter portion, host processor, and other elements of terminal 24 are omitted for the sake of simplicity.

Downlink signals transmitted by base station 22 are received by a radio frequency (RF) receiver 30 via antennas 32. RF receiver 30 amplifies, filters and downconverts the RF signals using a reference frequency input provided by a frequency synthesizer 34. Typically, the frequency synthesizer comprises a local oscillator with phase-locked loop (PLL) for frequency stabilization. RF receiver 30 generates a downconverted output signal, typically in the form of I and Q baseband signals, or alternatively as a complex intermediate frequency (IF) signal, as is known in the art. This output signal is converted into a stream of digital samples by an analog/digital (A/D) converter 36.

A digital processing circuit 38 processes the digital samples in order to recover the downlink data transmitted by the base station. Circuit 38 comprises a digital physical layer interface (PHY) 40, which converts the samples into a stream of data bits. The components of digital PHY 40 are known generally in the art, but they are described here for the sake of completeness: A digital front end (DFE) 42 performs initial filtering and resampling, following which the time-domain samples are converted to frequency-domain samples by a fast Fourier transform (FFT) processor 44. A detector 46 converts the samples into data symbols, using channel coefficients that are determined by a channel estimator (CE) 48 for each of the sub-carriers in the downlink signal. A forward error corrector (FEC) 50 decodes the symbols in order to recover the downlink data bit stream. A medium access control (MAC) processor 52 processes the data packets contained in the bit stream in order to extract the downlink data payloads and perform other MAC-level functions.

As will be explained in greater detail below, the downlink frames transmitted by base station 22 contain a map zone, in which the base station indicates the time slots and frequency sub-carriers that have been assigned to each wireless terminal 24. The map zone typically includes a downlink map, giving the slots in which downlink data will be transmitted to each wireless terminal, and an uplink map, giving the slots in which each wireless terminal may transmit uplink data in the next uplink frame. Wireless terminal 24 comprises an allocation processor 54, which processes the data in the map zone of the downlink frames in order to identify the downlink and uplink slots that have been assigned to this terminal. This sort of map processing is typically a function of the MAC processor, but it is shown here as a separate functional block for the sake of clarity.

A power controller 56 receives the slot assignment information from allocation processor 54, and uses this information in turning the other elements of wireless terminal 24 on and off as required. During a downlink frame that the wireless terminal has designated as a sleep frame (using the above-mentioned SLP-REQ message, for example), the power controller may shut off all the components of the receiver for the duration of the frame. On the other hand, even during downlink frames in which the terminal is prepared to receive data from the base station, the power controller may shut down certain components of the receiver during certain intervals within the frame. This novel function of the power controller is explained in detail with reference to the figures that follow. It permits the operating duty cycle of certain components of the wireless terminal to be reduced, thus reducing power consumption and extending battery life.

Although the components of wireless terminal 24 are shown in FIG. 2, for the sake of conceptual clarity, in terms of certain particular functional blocks, in practice these blocks may be parts of one or more dedicated or programmable integrated circuits. In particular, power controller 56 may be implemented either in software running on an embedded microprocessor or in a suitable logic circuit within a digital integrated circuit that also comprises PHY 40 and MAC processor 52. Alternatively, the power controller may comprise a separate microprocessor or logic circuit.

WiMAX Timing Scheme

Figure 3:
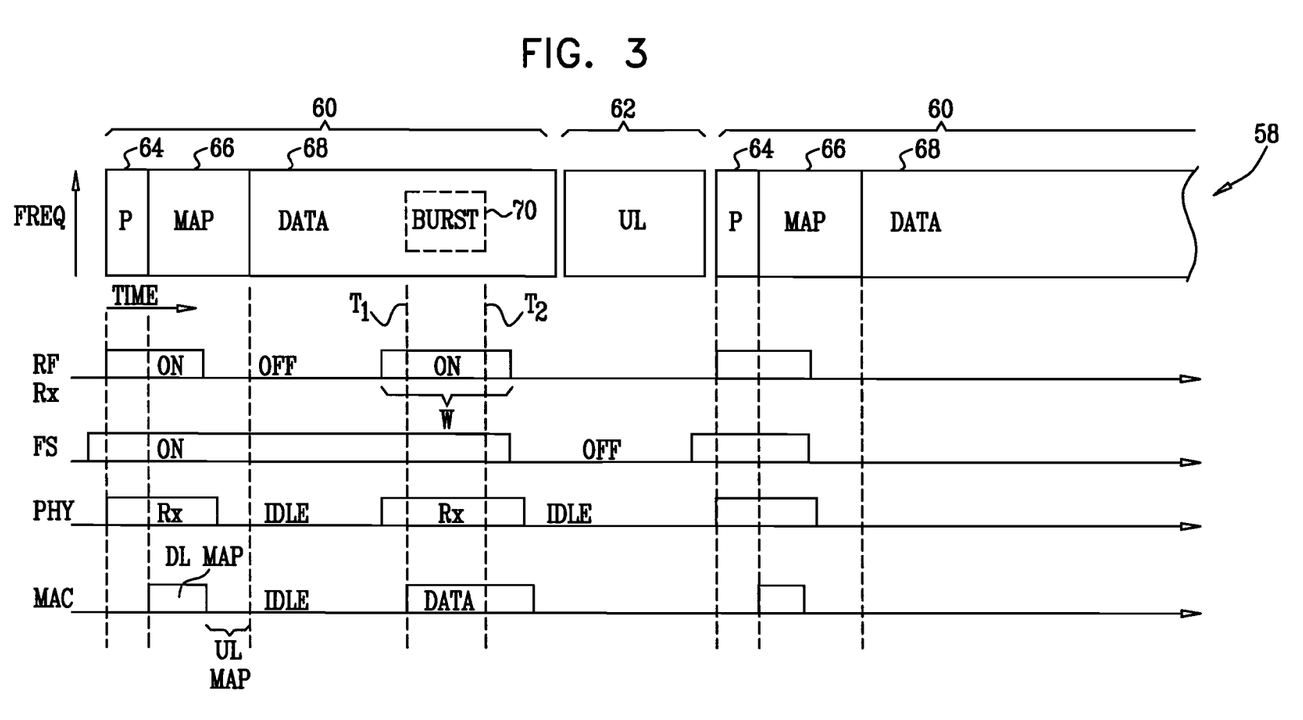
FIG. 3 is a schematic timing diagram showing a scheme for activation and shutdown of elements of a wireless terminal, in accordance with an embodiment of the present invention.

FIG. 3 is a schematic timing diagram that shows a scheme used by power controller 56 for activation and shutdown of components of wireless terminal 24, in accordance with an embodiment of the present invention. The scheme is keyed to a sequence 58 of downlink frames 60 and uplink frames 62 this is defined by timing signals transmitted by base station 22, in accordance with WiMAX standards. Each downlink frame comprises a preamble 64, containing a predefined symbol for synchronization purposes, followed by a map zone 66 and a data zone 68. (The view of the elements of frames 60 and 62 that is shown in FIG. 3 is simplified for the sake of clarity and omits parts of the frames that are not needed for an understanding of the present invention. Similarly, the names "map zone" and "data zone" are not specified by WiMAX standards but rather are used to denote functions carried out during certain portions of the downlink frame. The association between these "zones" and the relevant portions of the frames in WiMAX and other standards will be apparent to those skilled in the art.)

Map zone 66 typically comprises a downlink (DL) map, followed by an uplink (UL) map. The downlink map indicates a respective time allocation for each wireless terminal, comprising one or more bursts 70 within data zone 68 during which the base station will transmit downlink data to the wireless terminal, as well as the modulation and coding that the base station will apply to the downlink data in the corresponding bursts. In the present example, for the sake of simplicity, only a single burst 70 is shown and described, but the methods described hereinbelow may be extended in a straightforward manner to allocations comprising multiple bursts. Burst 70 is assumed to begin at a start time $T_1$ and end at an end time $T_2$ and to comprise a certain set of sub-carriers represented schematically by the vertical extent of the slot block in the figure. The burst may comprise a single slot or multiple slots, wherein each slot comprises a certain number of consecutive symbols over a certain number of subcarriers, as defined by WiMAX standards. The map zone may also contain broadcast packets (containing configuration information, for example), as well as additional maps (referred to as sub-maps in IEEE 802.16-2005).

As shown in FIG. 3, power controller 56 turns on RF receiver 30, frequency synthesizer 34, and PHY 40 during preamble 64 and map zone 66 in order to synchronize on downlink frame 60 and process the map information. MAC processor 52 is also activated during the map zone in order to extract the slot assignments and modulation/coding information from the map data. If wireless terminal 24 has requested a time allocation for uplink transmission, the power controller may activate the RF receiver, PHY and MAC processor during the entire map zone, in order to determine both the downlink and uplink slot assignments. Alternatively, if the wireless terminal has not requested an uplink allocation, the power controller may activate these circuits during only the downlink map portion of map zone 66, as shown in the figure.

Once the map information has been received and decoded, power controller 56 shuts down the RF receiver, PHY and MAC processor as soon as it has determined that there are no broadcast packets or sub-maps to follow. These components remain shut down during data zone 68 until the power controller reactivates them shortly before $T_1$. The frequency synthesizer may also be shut down during this interval or, alternatively, the frequency synthesizer may be left on, as shown in the figure, in order to avoid compromising frequency stability. After the wireless terminal has received and decoded the downlink data in burst 70, the power controller then shuts down the receiver components until they are needed again in the next downlink frame. Alternatively, if the map information in map zone 66 indicates that the base station has not assigned any downlink time allocation to the wireless terminal in the current downlink frame 60, then the power controller turns off the receiver components immediately after the map zone and does not activate them again until the beginning of the next downlink frame.

To enable the wireless terminals to perform channel estimation, base station 22 transmits pilot training signals at predetermined times and frequencies within each downlink frame 60, as defined by WiMAX standards. If wireless terminal 24 were stationary, and the channel invariant over time, it would be sufficient for channel estimator 48 (FIG. 2) to measure the channel coefficients once, and to use these coefficients thereafter without modification. In practice, however, motion of the wireless terminal and changes in channel conditions generally require that the wireless terminal continually receive and process the pilot signals transmitted by the base station in order to update the channel coefficients. To facilitate accurate updating of the channel coefficients, power controller 56 typically activates the receiver components for short periods before and after each burst 70, as shown in the figure and described in greater detail hereinbelow.

Figure 4:
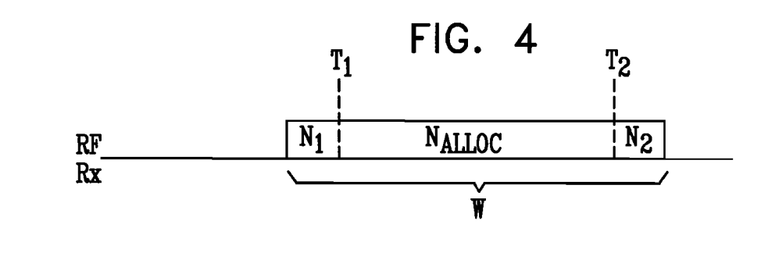
FIG. 4 is a schematic timing diagram showing a detail of the scheme of FIG. 3, in accordance with an embodiment of the present invention.

FIG. 4 is a schematic timing diagram that shows a detail of the timing scheme of FIG. 3, illustrating how power controller 56 times the activation and shutdown of RF receiver 30, in accordance with an embodiment of the present invention. Burst 70, as assigned by the base station, contains an allocated number, $N_{ALLOC}$, of data symbols. To capture additional pilot signals for channel estimation, the power controller turns on the RF receiver $N_1$ symbols before time $T_1$, and turns off the RF receiver $N_2$ symbols after time $T_2$. The total on-time of the RF receiver (in symbols) is thus $W=N_1+N_{ALLOC}+N_2$. The power controller times the activation and shutdown of the other receiver components accordingly.

The values of $N_1$ and $N_2$ depend on the coherence characteristics of the channel, such as the coherence bandwidth and coherence time. Specifically, when the wireless terminal is stationary or moving slowly, the channel will typically have high coherence time, i.e., there will be little change over time in the characteristics of successive pilot signals as received by the terminal. Channels with low delay-spread will typically have high coherence bandwidth, i.e., there will be relatively little change in channel response over the different frequency sub-carriers. When the coherence bandwidth is high and/or the coherence time is small, the power controller may generally use relatively small values of $N_1$ and $N_2$, whereas larger values may be needed under the opposite conditions. High-order modulation schemes and low coding gain increase sensitivity of the receiver to noise, and therefore may also require increased values of $N_1$ and $N_2$. Methods for calculating $N_1$ and $N_2$ based on these principles are described hereinbelow.

Figure 5:
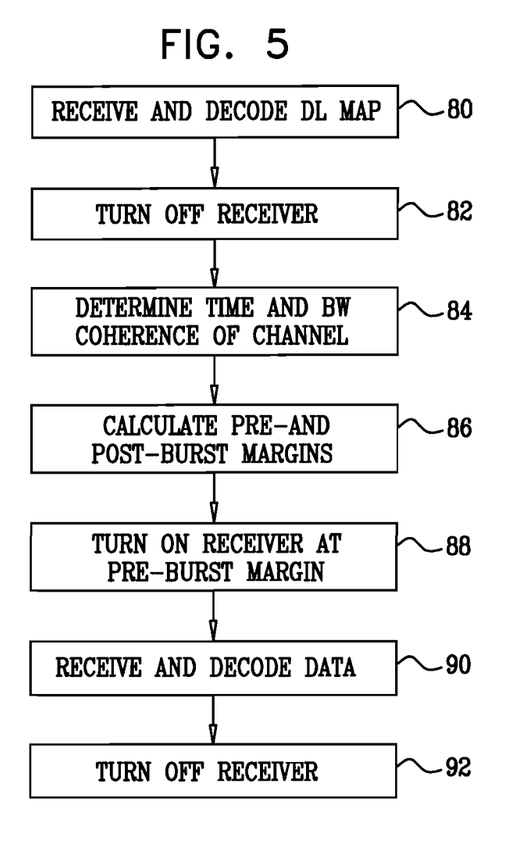
FIG. 5 is a flow chart that schematically illustrates a method for activation and shutdown of elements of a wireless terminal, in accordance with an embodiment of the present invention.

FIG. 5 is a flow chart that schematically illustrates a method for intra-frame activation and shutdown of elements of wireless terminal 24 by power controller 56, in accordance with an embodiment of the present invention. Immediately before preamble 64 (FIG. 3) of each downlink frame 60 in which the wireless terminal may receive downlink signals from base station 22, the power controller activates the elements of the wireless terminal that are needed to receive and decode the signals, at an initial reception step 80. These elements include RF receiver 30, A/D converter 36 and PHY 40, as well as frequency synthesizer 34 (which may be activated earlier to allow time for stabilization). Activation of MAC processor 52 may be delayed until after the preamble. Alternatively, only certain elements of terminal 24 with high power consumption, such as the RF receiver, may be shut down and activated in this manner, while other elements remain continuously on.

Once the requisite elements have been activated, wireless terminal 24 receives preamble 64 and the downlink map in map zone 66, and decodes the downlink map in order to identify the time, frequency and modulation parameters of burst 70. If necessary, the receiving elements of the wireless terminal may remain active during the remainder of the map zone in order to receive uplink map information and/or broadcast packets. Otherwise, to minimize power consumption, power controller 56 shuts down the receiving elements of the wireless terminal as soon as the downlink map has been decoded, at an initial shutdown step 82. If the base station has not allocated any downlink time to the wireless terminal in the current downlink frame 60, the receiving elements of the wireless terminal will remain shut down until the next frame.

Assuming the base station has assigned a downlink time allocation to the wireless terminal, power controller 56 determines the time and bandwidth coherence of the channel, at a coherence determination step 84. The coherence calculation is based on channel parameters measured by channel estimator 48 during the preamble and map zone. For example, a temporal coherence parameter $R_N(N)$ and a bandwidth coherence parameter $R_K(K)$ may be calculated as follows, as a function of the separation K between sub-carriers and the separation N between symbols:

$$R_K(K) = \sum_{n,k} r(k,n) r^*(k-K, n) \quad (1)$$

$$R_N(N) = \sum_{n,k} r(k,n) r^*(k, n-N)$$

wherein r(k,n) is the received pilot signal on sub-carrier k at symbol n, and the sums are taken over all received sub-carriers and symbols. $R_N(N)$ and $R_K(K)$, in other words, represent the correlation between symbols or sub-carriers as a function of their separation. In high-coherence channels, these coherence parameters will have high values even for relatively large values of N and K, whereas in low-coherence channels, the coherence parameters will be significant only for small values of N and K.

Based on these coherence parameters, the coherence bandwidth $C_{BW}$ and coherence time $C_T$ may be estimated as follows:

$$C_{BW} = \operatorname{argmin}_k(|R_K(k)/R_K(0) - \sqrt{2}/2|)$$

$$C_T = \operatorname{argmin}_n(|R_N(n)/R_N(0) - \sqrt{2}/2|) \quad (2)$$

Alternatively, other methods may be applied for estimating coherence time and bandwidth, as will be apparent to those skilled in the art. For example, the coherence time may be estimated simply based on gain variation between frames.

Using the coherence time and bandwidth determined at step 84, power controller 56 calculates the pre- and post-burst margins, $N_1$ and $N_2$, at a margin calculation step 86.

$$N_1 = f_1(C_{BW}, C_T, \sigma_n, \sigma_{MCS})$$

$$N_2 = f_2(C_{BW}, C_T, \sigma_n, \sigma_{MCS}) \quad (3)$$

Here $f_1$ and $f_2$ are predefined functions, which are typically stored by power controller 56 in the form of lookup tables. The functions are based on the coherence bandwidth and time, on the channel noise $\sigma_n$, and on the noise margin (i.e., the maximum permissible noise) associated with the modulation and coding scheme in use during the bursts indicated by the map, $\sigma_{MCS}$.

Various different functional forms may be used for $f_1$ and $f_2$, with the general characteristic that the margins $N_1$ and $N_2$ decrease as the coherence bandwidth increases, as the coherence time decreases, and/or as the signal/noise ratio (SNR) increases. Thus, for example, in low-mobility channels with good signal reception, the values of $N_1$ and $N_2$ will be small. If the length of burst 70, $N_{ALLOC}$, is also small (i.e., data transmitted in short bursts, as in voice communications, for instance), then the active duty cycle of the RF receiver and other circuits will be substantially reduced by shutting down the receiver circuits outside time W. On the other hand, the increase in margin values with channel degradation and wireless terminal mobility will ensure that data reception performance is not lost under these conditions relative to convention terminals in which the receiver circuits remain active throughout the downlink frame.

In one embodiment, the functions $f_1$ and $f_2$ may be defined, for cases of low SNR, on the basis of the target mean-square error of the channel estimator, $MSE = 10^{\sigma_{MCS}/10} - 10^{\sigma_n/10}$:

$$f_1 = f_2 = \max\left\{0, 0.5 * F * \left(\frac{10^{\sigma_n/10}}{MSE}\right)^2 \Big/ C_{BW} - N_{alloc}/2\right\} \quad (4)$$

In this formula, F is a scaling factor, which may be defined heuristically. For high SNR ($\sigma_n$ below a predefined threshold), an increased effective coherence bandwidth, $C_{BW\text{-}eff}$, which is adjusted for the channel noise $\sigma_n$, may be used in place of $C_{BW}$ in equation (4). Alternatively, in the high-SNR case, $C_{BW}$ may be replaced by $k_{eff} = \|w\|$, wherein w is the channel smoothing filter (which typically depends on $C_{BW}$ and $\sigma_n$, as is known in the art). Optionally, for channels with high temporal coherence ($C_T$ greater than a certain threshold), the values of $f_1$ and $f_2$ may be set to zero, and the channel estimate determined in the preamble may be used without modification in the data zone, as long as space-time coding is not used in the data zone.

The above functions are presented solely by way of example, and alternative functions may be used with similar results. When wireless terminal 24 comprises dual antennas 32, the applicable dual-antenna operating mode may cause the pilots to be diluted and the channel estimation performance requirements to be more demanding. The functions $f_1$ and $f_2$ may be adjusted to take into consideration the attributes of channel estimation under these conditions.

Using the pre-burst margin value calculated at step 86, power controller 56 turns on RF receiver 30 at a time that is $N_1$ symbols before the beginning of burst 70, at a pre-burst activation step 88. Frequency synthesizer 34 is activated shortly before this time, if the synthesizer was previously shut down. The power controller also activates A/D converter 36 and PHY 40 to process the signals that are output by the RF receiver. MAC processor 52 may be activated later, at time $T_1$, after the assigned time bursts are actually decoded by FEC 50.

RF receiver 30 and associated elements of wireless terminal 24 receive signals through the entire on-time $W = N_1 + N_{ALLOC} + N_2$, at a data reception step 90. PHY 40 processes the signals throughout this time period in order to update its estimate of channel characteristics and to demodulate the data on the signal sub-carriers using the channel estimate.

Upon conclusion of the post-burst margin, at a time that is $N_2$ symbols after the end of burst 70, power controller 56 shuts down RF receiver 30, at a post-burst shutdown step 92. Frequency synthesizer 34 and A/D converter 36 may also be shut down at this point. Typically, PHY 40 and MAC processor 52 are shut down a short time later, after they have completed processing of the data transmitted during burst 70. The receiving elements of wireless terminal 24 may remain shut down until the preamble of the next downlink frame in which the terminal may expect to receive data.

LTE Timing Scheme

FIG. 6 is a schematic timing diagram showing a scheme for activation and shutdown of elements of wireless terminal 24, in accordance with an alternative embodiment of the present invention. The timing scheme of FIG. 6 refers to a 3GPP-LTE system, in which a UE communicates with an eNodeB.

In the LTE standard, a downlink sub-frame may generally be followed and/or preceded by an uplink sub-frame or by another downlink sub-frame. Similarly, an uplink sub-frame may be followed and/or preceded by another uplink sub-frame or by a downlink sub-frame. For example, the LTE standard defines a Time-Division Duplexing (TDD) mode, which allows different patterns of alternation between uplink and downlink sub-frames. The standard also defines a Frequency-Division Duplexing (FDD) mode, in which the downlink and uplink are transmitted over different carrier frequencies. Thus, in FDD, each downlink sub-frame is preceded and followed by other downlink sub-frames.

In the example of FIG. 6, the eNodeB transmits a downlink sub-frame 100, which is preceded by another down-link sub-frame and followed by an uplink sub-frame. downlink sub-frame 100 begins with a PDCCH zone 104, which typically comprises between one and three OFDM symbols (referred to below as PDCCH symbols for clarity). In the PDCCH zone, the eNodeB transmits downlink allocation information, which allocates downlink resources to the different UE in a data zone 108 of the downlink sub-frame.

Typically, the eNodeB specifies Resource Blocks (RB), which define the OFDM sub-carriers allocated to each UE. The transmission may be unicast (i.e., addressed to a specific UE), multicast (addressed to a group of UE) or broadcast (addressed to all UEs). A certain UE may be allocated one or more RBs in which one transport block is transmitted per each Multi-Input-Multi-Output (MIMO) layer.

In the present example, a certain UE monitors the downlink transmission of the eNodeB. Power controller 56 of the UE turns on RF receiver 30, frequency synthesizer 34, and PHY 40 during PDCCH zone 104 in order to synchronize on downlink sub-frame 100 and process the allocation information. MAC processor 52 is also activated during the PDCCH zone in order to extract RB assignments and modulation/coding information from the PDCCH data.

In some embodiments, the UE may monitor only a subset of the PDCCH data. Once the appropriate PDCCH symbols have been received and decoded, power controller 56 shuts down the RF receiver, PHY and MAC processor as soon as it has determined that there are no bursts addressed to the UE in this sub-frame. These components remain shut down during data zone 108 until the power controller reactivates them. In the present example, the UE has been allocated a burst 112, and therefore the power controller keeps the different receiver components activated.

(In the example of FIG. 6, burst 112 is contiguous in the frequency domain, i.e., comprises a set of adjacent sub-carriers. In alternative embodiments, however, each allocation may comprise any set of sub-carriers, which may or may not be contiguous on the frequency axis.)

After the UE has received and decoded the downlink data in burst 112, the power controller may shut down the receiver components until they are needed again, provided it is not necessary to receive the next sub-frame. Reception of the next sub-frame may not be needed, for example, when the next sub-frame is an uplink sub-frame or a downlink sub-frame that is in the "off duration" of the DRX mechanism).

Alternatively, if the PDCCH information in PDCCH zone 104 indicates that the eNodeB has not assigned any downlink time allocation to the UE in the current downlink sub-frame, the power controller turns off the receiver components immediately after the completion of processing of the PDCCH zone and does not activate them again until the beginning of the next downlink sub-frame.

To enable the UE to perform channel estimation, the eNodeB transmits reference signals at predetermined times and frequencies within each downlink sub-frame, as defined by the LTE standard. Since the UE may be in motion and since channel conditions may vary over time, the UE continually receives and processes the reference signals transmitted by the eNodeB in order to update the channel coefficients. To facilitate accurate updating of the channel coefficients, power controller 56 activate the receiver components for short time periods before and after each burst 112.

The power controller may activate the receiver components for short periods before each PDCCH zone (assuming the preceding sub-frame is a downlink sub-frame), as well as after each PDCCH zone. In the LTE protocol, data zone 108 starts in the OFDM symbol that immediately follows PDCCH zone 104. In some embodiments, the power controller differentiates between several different scenarios, depending on the type of preceding and/or following sub-frames, and on whether or not these sub-frames contain allocations to the UE in question.

For example, when the preceding sub-frame is an uplink sub-frame, the power controller activates the receiver components at the beginning of the current sub-frame, since there are no reference signals to receive in the preceding sub-frame. When the preceding sub-frame is a downlink sub-frame, the power controller may activate the receiver components a short period before the current sub-frame, since the preceding sub-frame contains reference signals that should be received by the UE.

When the preceding sub-frame is a downlink sub-frame in which there was at least one allocation to the UE in question, the receiver components are typically already active at the beginning of the current sub-frame, and thus remain active at least until the end of the PDCCH zone. When there are no allocations to the UE in the current sub-frame, the power controller deactivates the receiver components a short period after the PDCCH zone. The period duration typically depends on the number of OFDM symbols containing reference signals that are required for proper channel estimation, and on the time needed for the UE to process these PDCCH symbols and determine that there are no allocations to the terminal in the current sub-frame.

When the current downlink sub-frame contains allocations to the UE, and the following sub-frame is not a downlink sub-frame that the terminal is required to monitor, the power controller deactivates the receiver components a short period after the end of the sub-frame. The period duration is determined according to the number of OFDM symbols containing reference signals that are needed for proper channel estimation and detection of the allocated data bursts. The receiver may determine whether or not it is desirable to process reference signals of the following sub-frame based on, for example, the channel conditions and the burst parameters.

When the current sub-frame contains allocations to the UE, and the following sub-frame is a down-link sub-frame that the terminal has to monitor, the power controller leaves the receiver components active through the beginning of the following sub-frame. the receiver may use the reference signals of the following sub-frame to estimate the channel for the current sub-frame.

In LTE, the reference signals are located in the first and third-before-last OFDM symbols of each slot, which is typically six or seven symbols long. A sub-frame typically consists of two slots. In some cases, such as when the eNodeB uses more than two transmit antennas, the second OFDM symbol of the sub-frame is also used for transmitting reference signals. The PDCCH is typically located in the first one to three OFDM symbols of the sub-frame. Therefore, if the receiver requires more reference signals in addition to the signals in the first (and potentially second) OFDM symbol for proper PDCCH detection, the pre-sub-frame (pre-burst) margin should be at least three symbols long. Additionally or alternatively, the post-sub-frame (post-burst) margin should enable reception of the first symbol (or two first symbols) of the following sub-frame. The pre-sub-frame setting is relevant, of course, when the preceding sub-frame is a downlink sub-frame. The post-sub-frame setting is relevant when the following sub-frame is a downlink sub-frame.

Using the notation of FIG. 4 above, the PDCCH zone of a sub-frame having a burst that is allocated to the UE begins at time $T_1$. The burst ends at time $T_2$. The pre-sub-frame margin used for capturing additional reference signals is denoted $N_1$ and the post-sub-frame margin is denoted $N_2$. The total on-time of the RF receiver (in symbols) is thus $W=N_1+N_{ALLOC}+N_2$. The power controller times the activation and shutdown of the other receiver components accordingly. The considerations and mechanisms for determining the values of $N_1$ and $N_2$ in the LTE application are similar to the mechanisms described above for WiMAX applications.

FIG. 7 is a flow chart that schematically illustrates a method for activation and shutdown of elements of an LTE UE by power controller 56, in accordance with an embodiment of the present invention. Initially, i.e., before each downlink sub-frame 100 in which the UE may receive downlink signals from the eNodeB, the power controller activates the UE elements that are needed to receive and decode the signals, at an initial activation step 114. The initial activation is similar to step 80 of the method of FIG. 5 above.

Once the appropriate receiver components have been activated, the UE receives and decodes the downlink PDCCH in PDCCH zone 104, at a PDCCH reception step 116. The UE decodes the downlink PDCCH zone in order to identify the frequency and modulation parameters of burst 112, which is allocated to the UE by the eNodeB. To minimize power consumption, power controller 56 may shut down the receiving elements of the UE as soon as the downlink PDCCH has been decoded, at an initial deactivation step 118. Controller 56 may shut down the receiver elements, for example, if the eNodeB has not allocated any downlink resources to the UE in the current downlink sub-frame 100. In this case, the receiving elements of the UE will remain shut down until the next sub-frame (or until the pre-sub-frame time of the next sub-frame).

Power controller 56 continuously determines the SNR, as well as the time and bandwidth coherence of the channel, at a SNR and coherence determination step 120. The coherence calculation may be carried out using any of the methods described in FIG. 5 above. In LTE, the calculation of these parameters may be performed based on the reference signals, synchronization signals, PDCCH sub-carriers and/or data sub-carriers, which were obtained from previous sub-frames.

Using the SNR, coherence time and coherence bandwidth estimated at step 120, power controller 56 calculates the pre- and post-sub-frame margins, $N_1$ and $N_2$, at a sub-frame margin calculation step 124. As noted above, the power controller may take into account the identity of the preceding and following sub-frames and/or the presence or absence of allocations to the UE in these sub-frames, when determining the pre- and post-sub-frame margins.

As noted in the description of FIG. 5 above, the pre- and post-sub-frame margins may be calculated by evaluating pre-defined functions, which are typically stored by power controller 56 in the form of lookup tables. Any of the functions and mechanisms described in step 86 of FIG. 5 above can be used for this purpose.

Using the pre-sub-frame margin value calculated at step 124, power controller 56 turns on RF receiver 30 at a time that is $N_1$ symbols before the beginning of the sub-frame, at a pre-sub-frame activation step 132. Frequency synthesizer 34 is activated shortly before this time, if the synthesizer was previously shut down. The power controller also activates A/D converter 36 and PHY 40 to process the signals that are output by the RF receiver. MAC processor 52 may be activated later, after the PDCCH symbols and/or the allocated data bursts are actually decoded by FEC 50.

RF receiver 30 and associated elements of the UE receive signals through the entire on-time $W=N_1+N_{ALLOC}+N_2$, at a data reception step 136. PHY 40 processes the signals throughout this time period in order to update its estimate of channel characteristics and to demodulate the data on the signal sub-carriers using the channel estimate.

Upon conclusion of the post-sub-frame margin, at a time that is $N_2$ symbols after the end of burst 112, power controller 56 shuts down RF receiver 30, at a post-sub-frame shutdown step 140. Frequency synthesizer 34 and A/D converter 36 may also be shut down at this point. Typically, PHY 40 and MAC processor 52 are shut down a short time later, after they have completed processing of the data transmitted during burst 112. The receiving elements of the UE may remain shut down until the next downlink sub-frame in which the UE may expect to receive data.

Although the embodiments described above relate to certain specific aspects of WiMAX and LTE systems and protocols, the principles of the present invention may also be implemented, mutatis mutandis, in systems using other slotted multiple-access wireless standards. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A terminal for use in a wireless network, the terminal comprising:
   a radio frequency (RF) receiver, which is configured to receive a RF signal transmitted by an evolved NodeB (eNodeB) in accordance with a Third Generation Partnership Project-Long Term Evolution (3GPP-LTE) standard over a wireless channel and to downconvert the RF signal so as to generate an output signal, the RF signal comprising downlink frames, each downlink frame comprising at least an allocation zone followed by a data zone, the allocation zone containing Physical Downlink Control Channel (PDCCH) symbols providing an indication of a time allocation in the data zone during which downlink data will be transmitted to the terminal;
   an analog/digital (A/D) converter, which is coupled to convert the output signal into a stream of digital samples; and
   a digital processing circuit, which is coupled to process the digital samples of the PDCCH symbols transmitted in the allocation zone of at least one downlink frame so as both to identify the time allocation and to estimate one or more characteristics of the wireless channel in order to calculate a margin as a function of the estimated characteristics, and then to process the digital samples in the data zone of the downlink frame so as to recover the downlink data transmitted during the identified time allocation, and to shut down the RF receiver at a shut-down time that follows an end time of the time allocation in the downlink frame by the margin.

2. The terminal according to claim 1, wherein the digital processing circuit comprises:
   a digital physical layer interface (PHY);
   a medium access control (MAC) processor; and
   a power controller, which is coupled to shut down at least one digital component of the terminal, in addition to the RF receiver, at the shut-down time, wherein the at least one digital component is selected from a group of components consisting of the A/D converter, the PHY, and the MAC processor.

3. The terminal according to claim 1, wherein the time allocation has a start time, and wherein the digital processing circuit is configured to calculate a pre-allocation margin as a function of the estimated characteristics, to shut down the RF receiver after receiving at least part of the allocation zone, and then to activate the RF receiver at an activation time that precedes the start time of the time allocation by the pre-allocation margin.

4. The terminal according to claim 3, wherein the digital control circuit is coupled to determine the pre-allocation margin for a time allocation in a given downlink frame responsively to a frame that precedes the given downlink frame.

5. The terminal according to claim 4, wherein the digital control circuit is coupled to determine the pre-allocation margin responsively to performing at least one action selected from a group of actions consisting of:
   determining whether the frame that precedes the given downlink frame comprises another downlink frame; and
   determining whether the frame that precedes the given downlink frame contains another time allocation to the terminal.

6. The terminal according to claim 1, wherein the one or more characteristics comprise channel coherence characteristics.

7. The terminal according to claim 6, wherein the channel coherence characteristics comprise a temporal coherence and a bandwidth coherence.

8. The terminal according to claim 1, wherein the one or more characteristics comprise a signal/noise ratio (SNR) of the wireless channel.

9. The terminal according to claim 1, wherein the downlink frame comprises a predefined synchronization signal that precedes the allocation zone, and wherein the digital processing circuit is configured to process the digital samples during the predefined synchronization signal in order to determine the one or more characteristics of the wireless channel.

10. The terminal according to claim 1, wherein the digital control circuit is coupled to determine the margin for a time allocation in a given downlink frame responsively to a frame that follows the given downlink frame.

11. The terminal according to claim 10, wherein the digital control circuit is coupled to determine the margin responsively to determining whether the frame that follows the given downlink frame comprises another downlink frame.

12. The terminal according to claim 1, wherein the digital processing circuit is configured to make a determination that no time has been allocated for transmission to the terminal during a given downlink frame, and to shut down the RF receiver through all of the data zone of the given downlink frame responsively to the determination.

13. The terminal according to claim 1, wherein the downlink frames are transmitted by a base station in accordance with an IEEE 802.16 standard.

14. The terminal according to claim 13, wherein the digital processing circuit is coupled to identify the time allocation by decoding a downlink map message transmitted in the allocation zone.

15. A method for communication, comprising:
   receiving a radio frequency (RF) signal transmitted by an evolved NodeB (eNodeB) in accordance with a Third Generation Partnership Project-Long Term Evolution (3GPP-LTE) standard over a wireless channel and downconverting the RF signal using a RF receiver of a wireless terminal, so as to generate an output signal, the RF signal comprising downlink frames, each downlink frame comprising at least an allocation zone followed by a data zone, the allocation zone containing Physical Downlink Control Channel (PDCCH) symbols providing an indication of a time allocation in the data zone during which downlink data will be transmitted to the wireless terminal;
   converting the output signal into a stream of digital samples;
   processing the digital samples of the PDCCH symbols transmitted in the allocation zone of at least one downlink frame so as both to identify the time allocation and to estimate one or more characteristics of the wireless channel in order to calculate a margin as a function of the estimated characteristics;
   processing the digital samples in the data zone of the downlink frame so as to recover the downlink data transmitted during the identified time allocation; and
   shutting down the RF receiver at a shut-down time that follows an end time of the time allocation in the downlink frame by the margin.

16. The method according to claim 15, and comprising shutting down at least one digital component of the wireless terminal, in addition to the RF receiver, at the shut-down time, wherein the at least one digital component is selected from a group of components consisting of an analog/digital (A/D) converter, a digital physical layer interface (PHY), and a medium access control (MAC) processor.

17. The method according to claim 15, wherein the time allocation has a start time, wherein processing the digital samples in the allocation zone comprises calculating a pre-allocation margin as a function of the estimated characteristics, and wherein shutting down the RF receiver comprises controlling the RF receiver so as to shut down the RF receiver after receiving at least part of the allocation zone, and then to activate the RF receiver at an activation time that precedes the start time of the time allocation by the activation margin.

18. The method according to claim 17, wherein controlling the RF receiver comprises determining the pre-allocation margin for a time allocation in a given downlink frame responsively to a frame that precedes the given downlink frame.

19. The method according to claim 18, wherein determining the pre-allocation margin comprises performing at least one action selected from a group of actions consisting of:
   determining whether the frame that precedes the given downlink frame comprises another downlink frame; and
   determining whether the frame that precedes the given downlink frame contains another time allocation to the terminal.

20. The method according to claim 17, wherein controlling the RF receiver comprises determining the margin for a time allocation in a given downlink frame responsively to a frame that follows the given downlink frame.

21. The method according to claim 20, wherein determining the margin comprises determining whether the frame that follows the given downlink frame comprises another downlink frame.

22. The method according to claim 15, wherein the one or more characteristics comprise channel coherence characteristics.

23. The method according to claim 22, wherein the channel coherence characteristics comprise a temporal coherence and a bandwidth coherence.

24. The method according to claim 15, wherein the one or more characteristics comprise a signal/noise ratio (SNR) of the wireless channel.

25. The method according to claim 15, wherein the downlink frame comprises a predefined synchronization signal that precedes the allocation zone, and wherein processing the digital samples comprises processing the digital samples during the predefined synchronization signal in order to determine the one or more characteristics of the wireless channel.

26. The method according to claim 15, wherein processing the digital samples comprises making a determination that no time has been allocated for transmission to the terminal during a given downlink frame, and shutting down the RF receiver through all of the data zone of the given downlink frame responsively to the determination.

27. The method according to claim 15, wherein the downlink frames are transmitted by a base station in accordance with an IEEE 802.16 standard.

28. The method according to claim 27, wherein processing the digital samples comprises identifying the time allocation by decoding a downlink map message transmitted in the allocation zone.

\* \* \* \* \*